United States Patent [19]

Erhard-Hollmann

[11] Patent Number: 5,569,147
[45] Date of Patent: Oct. 29, 1996

[54] METHOD AND DEVICE TO PRODUCE CORRUGATED STRIP PACKAGING PARTS

[75] Inventor: Joachim Erhard-Hollmann, Wiesbaden, Germany

[73] Assignee: Alpha Industrie Design GmbH, Wiesbaden, Germany

[21] Appl. No.: 144,251

[22] Filed: Nov. 1, 1993

[30] Foreign Application Priority Data

Nov. 2, 1992 [DE] Germany ........................... 42 36 981.9
Apr. 16, 1993 [CH] Switzerland .......................... 01165/93

[51] Int. Cl.⁶ ............................. B65H 45/30; B31F 1/28; B31F 1/24
[52] U.S. Cl. ........................ 493/423; 156/471; 156/205; 156/210; 493/451; 493/463
[58] Field of Search ........................... 156/205, 210, 156/471; 493/423, 451, 463

[56] References Cited

U.S. PATENT DOCUMENTS

| 690,713 | 1/1902 | Ferres ............................ 156/471 |
| 2,525,202 | 10/1950 | Bossi ............................. 156/471 |
| 2,556,011 | 6/1951 | Swayze et al. ................ 154/33.05 |
| 2,764,193 | 9/1956 | Knowles ........................ 156/205 |
| 2,785,717 | 3/1957 | Knowles ........................ 493/463 |
| 3,053,309 | 9/1962 | Wilson et al. .................. 156/205 |
| 3,157,551 | 11/1964 | Granozio ........................ 156/471 |
| 3,567,553 | 3/1971 | Van Antwerpen ............ 156/471 |
| 3,784,430 | 1/1974 | Gilbert et al. ................. 156/200 |

FOREIGN PATENT DOCUMENTS

| 652497 | 12/1964 | Belgium . |
| 0008225 | 2/1980 | European Pat. Off. ......... B31F 1/20 |
| 1220899 | 5/1960 | France ............................. 156/471 |
| 1015673 | 12/1957 | Germany . |
| 363227 | 9/1962 | Switzerland . |
| 367383 | 4/1963 | Switzerland . |
| 370951 | 9/1963 | Switzerland . |
| 317552 | 10/1971 | U.S.S.R. ........................... 156/471 |
| 927711 | 6/1963 | United Kingdom ............ 156/471 |
| 2036823 | 7/1980 | United Kingdom ............ B31F 1/24 |

*Primary Examiner*—Jack W. Lavinder
*Attorney, Agent, or Firm*—Michael D. Bednarek; Marks & Murase L.L.P.

[57] ABSTRACT

A method and a device for producing corrugated strip packaging parts to be used for packaging cylindrical or elongated parts in separate compartments. The device includes a series of form bodies arranged on an endlessly rotating belt. The form bodies have essentially the same inside cross-section as the lower loops of the corrugated strip material formed by the device and are joined together at their base flanks by elastic material areas. The belt is guided over rerouting points that temporarily spread apart two adjacent form bodies to form an enlarged intermediate space. A form tool is arranged adjacent one of the rerouting points to engage and press the material of the packaging part into the enlarged intermediate space. After the first rerouting point, the belt is guided along a straight section along which a gluing device applies glue to the packaging material, a carrier sheet is applied and pressed to the packaging material, and a cutting device cuts the corrugated strip material into predetermined lengths. The corrugated strip parts are removed from the form bodies at a second rerouting point that separates adjacent form bodies. Various embodiments of the form bodies, the form tool, and the cutting device are provided.

26 Claims, 7 Drawing Sheets

METHOD AND DEVICE TO PRODUCE CORRUGATED STRIP PACKAGING PARTS

FIELD OF THE INVENTION

The invention relates to a method and a device to produce corrugated strip packaging parts.

To avoid confusion with the term "corrugated board" in its commonly understood meaning of enveloping packaging material, the packaging parts referred to here will be designated as "corrugated strip packaging parts" for the purpose of this description. Such parts are also known as round parts.

Figure 1:
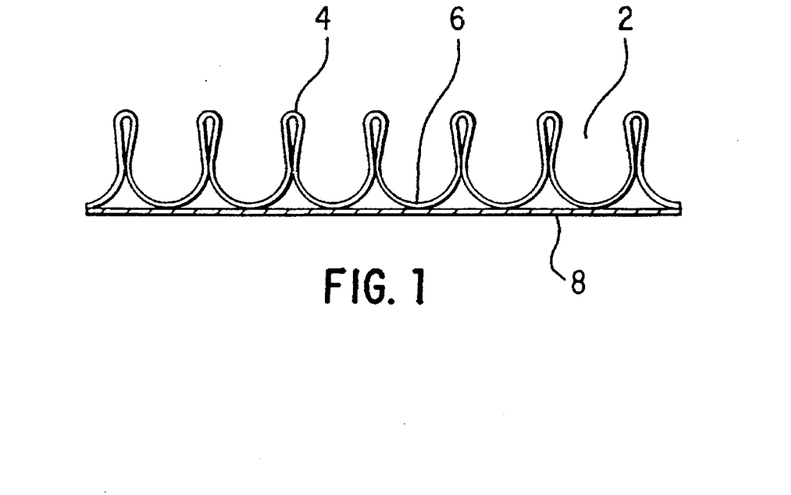
FIG. 1 is a lateral section of a corrugated strip packaging part.
Figure 2:
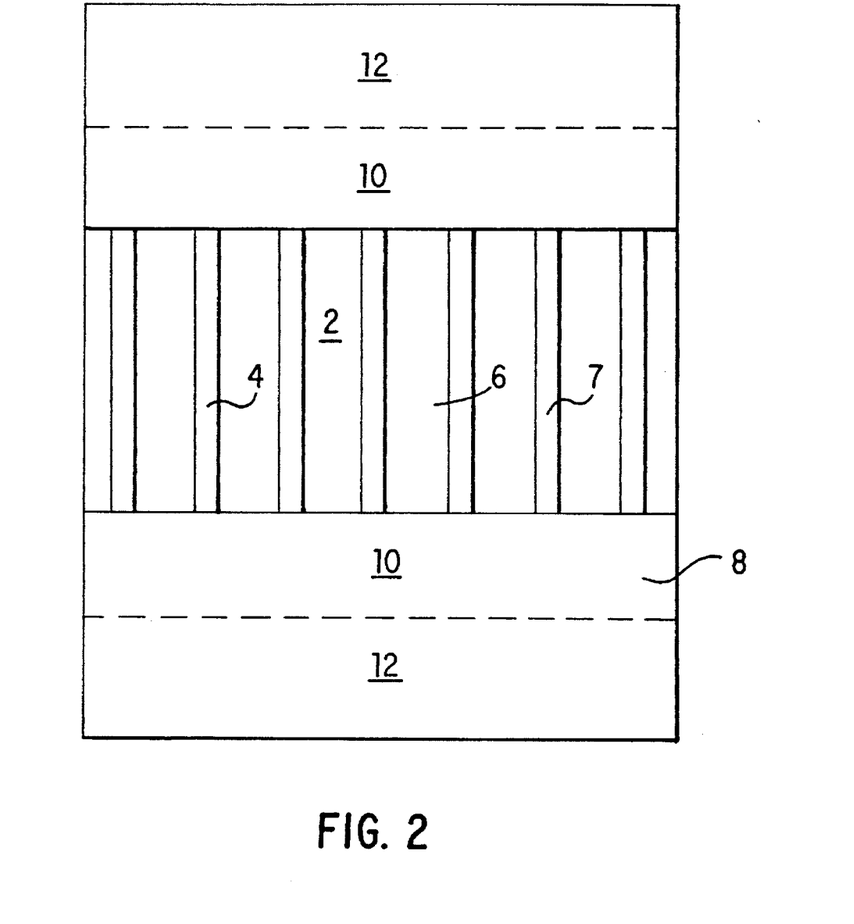
FIG. 2 is a top view of a corrugated strip packaging part with laterally projecting carriers.
Figure 3:
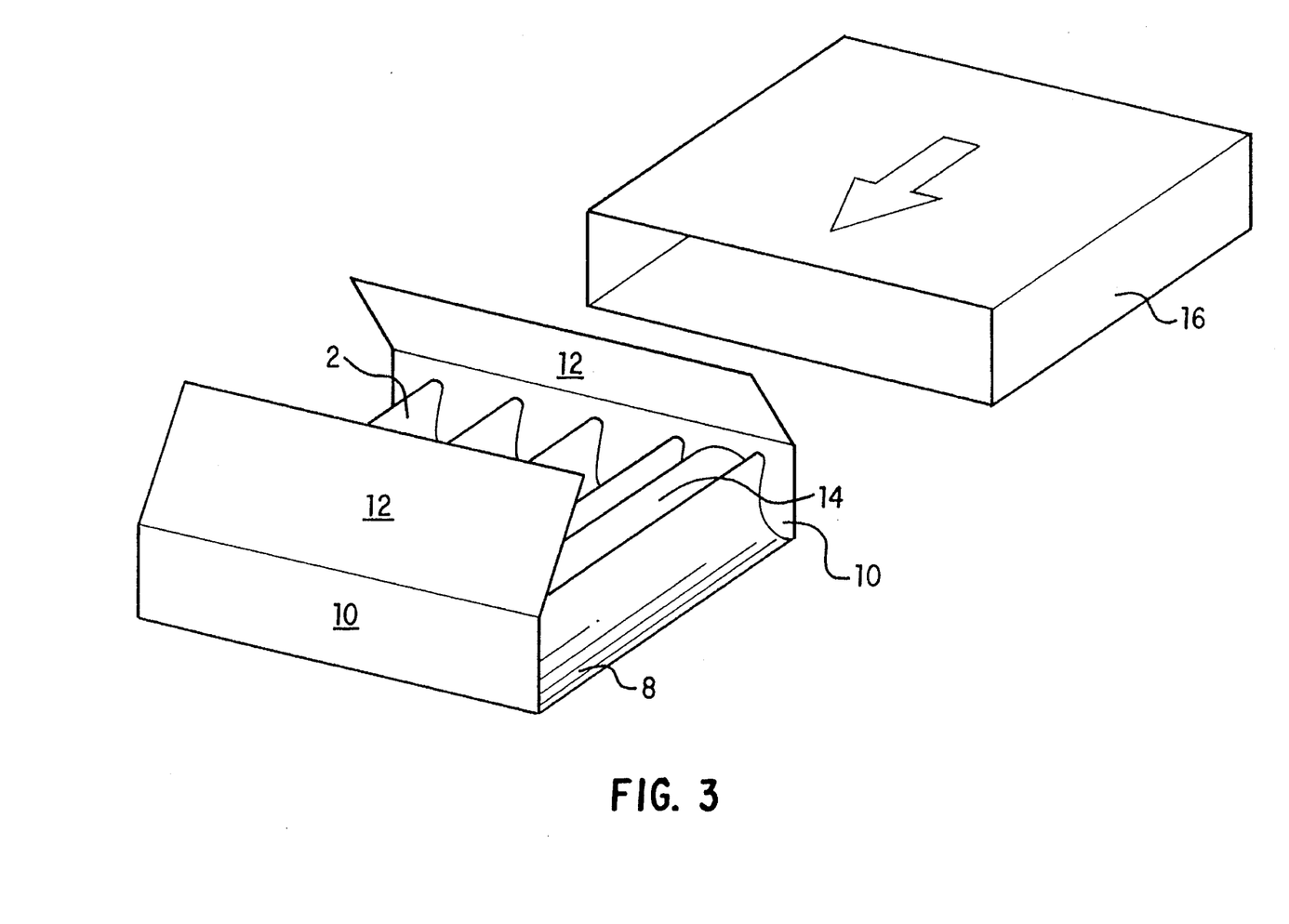
FIG. 3 is a perspective view of a possible overall packaging according to the form of construction in FIG. 2.

To simplify the conceptual explanations, reference is made to FIGS. 1 and 2 which show a corrugated strip packaging part that was produced by the method according to the invention, and to FIG. 3 which shows, in perspective illustration, a possible overall packaging that uses such a corrugated strip packaging part.

It is important to note, in the side-view crosssection of FIG. 1, an undulation or corrugated strip 2 generally produced from a section of an endless length of material. This strip has relatively narrow upper loops 4 and wide lower loops 6 which are glued onto a carrier sheet 8, forming altogether the corrugated strip packaging part in question.

Such a corrugated strip packaging part is used, for example, to receive cylindrical or elongated parts such as tablet tubes, ampules, crayons or the like which are either liable to break and thus kept at safe distance and separate from each other by the superior parts of the undulation, or which should not touch each other for other reasons, for example because they would scratch each other. The ideal shape of the undulation, shown in FIG. 1, in which the upper loops 4 narrow again below their apex lines, thus undercutting somewhat the receiving space of the lower loops 6, is not only suitable for keeping packaged objects separate from each other, but also holds the objects tight to a certain extent. In this way, they cannot easily fall out of the packaging part, because they can only be taken back out by overcoming the elastic resistance of the undulation, i.e., by a certain bending apart of the upper undulation loops.

As can be seen in FIG. 2, in a special embodiment, the carrier sheet 8 can also project laterally over the corrugated strip, and this projection can be formed into brackets 10 and 12 that can be folded laterally upwards and over the packaged objects 14, as shown in FIG. 3. In addition, the unit thus formed can then be pushed into a packaging covering 16, as implied in FIG. 3.

BACKGROUND OF THE INVENTION

Such corrugated strip packaging parts of cardboard, pasteboard or the like have been known for quite a while. The technology of molded plastic packaging has largely squeezed corrugated parts of cardboard or pasteboard out of the market in recent years, however. This is explained not only by the very rational production methods for plastic molded parts, but also by the fact that plastic molded parts can easily be specially adapted to the form of any object to be packaged. In particular, the undercuts retaining the objects in the indentations are easier to reach in the molding of plastic than in the corrugation of cardboard.

In general, repackaging and other packaging parts of cardboard or corrugated board, in particular micro-corrugated board, are also used for the objects inserted into molded plastic parts. This results in packaging waste of two different materials which causes sorting and processing problems especially in view of the recent environmental awareness. We are therefore seeing a trend toward the comeback of corrugated strip packaging parts of cardboard or pasteboard, in such a way that the packing consists entirely of fibrous material that can be returned to paper production.

As already mentioned, however, there are problems in processing cardboard and pasteboard into such corrugated strip packaging parts in a precise, appealing shape.

A typical machine for producing corrugated strip packaging parts can be seen in German Patent DE-B-1 015 673, for example. This patent is somewhat confusingly entitled "machine for producing corrugated board". As one can easily see from the drawings of the patent, however, the procedural principle on which the described device is based lies in the fact that a sequence of cylindrical rods at a distance from each other is held at the perimeter of two separate gearwheels, and that the length of material to be molded into the undulation by means of a toothed roller representing a form tool is pressed into the intervals between the rods. In the process, the length of material is placed against the perimeter sections facing the toothed roller to form the lower loops of the undulation. As can easily be seen from FIG. 1, it is not desirable to make the upper loops of the undulation very wide, since on the one hand, an unnecessary amount of space is wasted for this and on the other hand, the undercut effect is not achieved. The ideal shape of the undulation is therefore achieved when the legs of the upper loops more or less touch each other halfway up, but the upper loops somewhat widen above this point of contact and form a well defined radius.

In shaping, there is a limit to how narrow the upper loops can be formed, because otherwise a form tool will not be able to engage. Therefore, in the device according to German Patent DE-B 1 015 673, the freshly formed corrugated strip, which still contains the cylindrical rods as forming bodies in the lower loops, is pushed together on a basically level stretch, during which the upper loops narrow but the lower loops remain unchanged because of the rods in them. In this pushed together condition, the undulation is then glued onto a carrier sheet, in such a way that the forming bodies can subsequently be removed without the undulation changing again.

In pushing together the undulations according to the method illustrated in German Patent DE-B 1 015 673, well formed upper loops, as shown in FIG. 1, are obtained at best only if a very long-fibered, elastic material is used that does not tend to bend or break in the summits of the upper loops. For packaging parts of the type concerned, however, it is desirable to use inexpensive fibrous materials containing either a large portion of wood-pulp or also reclaimed fibers from used paper. These products are generally far less elastic than lengths of fresh, long-fibered cellulose.

During processing in a device according to German Patent DE-B 1 015 673, such a less elastic material does not tend to maintain the desired, continuously curved shape in the area of the upper loops when the undulations are pushed together, but rather it tends to bend or break, in such a way that the undulation looses its curvatures in its upper area and takes on the form of a series of joined together U's. This process is favored by the fact that when the undulation is pushed together according to the known method, the upper loops can slide freely upwards in such a way that during pushing together, there is a flattening of the upper loops while their height and thus their bending increases.

SUMMARY OF THE INVENTION

The object of the present invention is to introduce a method by which the forming of the upper loops of the undulation is generally improved and the processing of more brittle materials is also made possible. Another object of the invention is to produce a device with which the new method can be effectively and economically carried out.

According to the invention, these objects are achieved by supporting the upper loops of the corrugated strip at least in the area of their summits or peaks by means of an external form surface during the time the upper loops are pushed together. The device of the present invention is characterized in that the form bodies are arranged on an endlessly rotating belt that is guided over at least one rerouting point at which, by the rerouting of the belt, at any given time two adjacent form bodies can be temporarily spread apart to form an enlarged intermediate space, and that the form tools are arranged adjacent to this rerouting point to engage in this enlarged intermediate space.

The following are essential to the new method and the new device: during the pushing together of the upper loops, which basically takes place individually in this case, the undulation is guided from outside in the area of the upper loops by laying against a form surface, in such a way that the upper loops can and must basically maintain their original curve condition in the summit area and only the legs of the upper loops are pushed together in their middle area about halfway up. According to the invention, this form surface is practically achieved by the form bodies having essentially the inside cross-section of the lower loops and being joined together at their base flanks running out toward the upper loops by elastic material areas forming the form surface to lay against the upper undulation loops.

Referring back to the state of the art and with reference to the conventional form of construction of corrugated strip packaging parts, e.g., as shown in FIGS. 1–3, the known designation "upper" and "lower loop" will continue to be used below. It is expressly pointed out, however, that the form bodies according to the present invention can easily be designed in such a way that the loops assume the shape of triangles or trapezoids, or that by the forming of appropriate form bodies, a nearly rectangular folded corrugated strip packaging part can be produced. Where necessary, for modified form bodies, the form tool must be adapted and also modified to guarantee that the length of material can be largely laid against the form bodies.

The distance required between two form bodies to insert or push the length of material for the undulation in between the form bodies with a suitable form tool is temporarily created by having two adjacent form bodies spread apart with their summit areas spaced apart. This in turn becomes possible through the elastic connection of the form bodies at their base. Once the length of material, in the spread state of two adjacent form bodies, is pressed into the interval by the form tool and is brought to lay against the form bodies and the form surface, the narrowing of the upper loops essentially occurs individually by the fact that the spread form bodies are brought back into their normal position closer to each other, while the length of material remains laying against the flanks of the form bodies and the elastic form surface connecting them.

In practice according to the device of the present invention, this step is achieved by having the form bodies attached at equal distance on an endlessly rotating, flexible carrier belt. If this carrier belt is guided around a relatively sharp-angled rerouting point, two adjacent form bodies spread apart when the subsequent form body is still vertical to the first direction and the preceding form body is already vertical to the rerouted direction of the flexible belt. At this moment in the spreading, a suitable form tool presses the length of material into the interval between these two form bodies. When the subsequent form body also passes the rerouting point, it returns, with regard to its plane of symmetry, parallel to the preceding form body, whereby the upper loops of the strip of material have already been narrowed and brought into their final form.

Since the form body or form body belt and form tool engage each other tightly at the rerouting point of the form body belt during insertion of the length of material, the forward feed of the form body belt can be caused by having it connected with an appropriate drive and transported by this drive. According to a preferred form of construction, however, as an alternative the form tool is driven and pulls or pushes the length of material into the intermediate space between the spread apart form bodies, in such a way that the length of material is laid tightly against the surface of the form bodies. In this form of construction, the form bodies belt is passively pushed forward.

Of course, it is also conceivable to have the form body belt as well as the form tool driven. In this case, however, particular attention must be given to precisely coordinating the forward pushing speeds between the form body belt and the form tool to prevent undesired stretching of the length of material at the rerouting point and thereby disturbed shaping.

Particular attention must be given to the kind of rerouting of the form body belt and the behavior of the elastic form surfaces connecting the form bodies as well as the behavior of the form bodies themselves at this rerouting point. In the process, one must make sure that the elastic form surfaces do not curve too concavely outward at their immediate passing of the rerouting point. The result of this could be that when the adjacent form bodies are brought back together, the length of material laid against the form surface might not insert itself in concavely into the now concavely formed form surface, but instead might spring outward into a convex fold.

In this connection, the means by which the rerouting of the form body belt occurs also has substantial influence. According to the invention, a prismatic polygonal roller is preferably used in this instance. Most preferably, a triangular roller dimensioned such that the distances between its corners is equal to the base width of a form body, and whose corners each engage the form surface area of the belt between two form bodies is used. In this design, the form bodies themselves are lifted, lying on a surface of the triangular roller, around the corner. The degree of rounding of the angles of this rerouting roller can influence the forming of the form surface in the rerouting area.

According to the further form of construction of the invention, the means to reroute the form body belt is designed as a cylindrical roller, since it has been shown that the desired spreading apart of the form body belt can also be achieved if this belt is guided over a simple, cylindrical roller. In the process, the diameter of the roller should be coordinated with the size and design of the form body.

To achieve a constant transitional behavior between the flanks of the form bodies and the form surface material connecting them, it can be useful to provide the form body, otherwise consisting of a relatively rigid elastic material, with a lumen-type cavity thus producing flank walls with reduced thickness that form a constant transition to the flexible form surface.

To obtain a uniformly-shaped corrugated strip packaging, it is advantageous, after unrolling the length of material and before feeding it into the device according to the invention, i.e., in particular before insertion into the form body belt, to pre-bend it or pre-break it at appropriate rerouting points in such a way that the length of material can be formed completely laying against the form bodies without using great force. But the pre-bending or pre-breaking serves mainly to improve suppleness; a reduction of the solidity of the length of material is not intended at all, and the rerouting point of the length of material, e.g., rerouting rollers, cylinders or rods are designed in such a way that this is reliably prevented. The rerouting points of the length of material can be driven, but it is also conceivable to have the length of material unrolled in controlled manner from a supply roll and to have the pre-bending take place during the controlled unrolling of the length of material.

The laying of the length of material against the form bodies takes place quite easily and uniformly, if the length of material is freely sagging before insertion into the form tool, in such a way that the laying against the form bodies is not influenced by any tensile stress in the length of material. Accordingly, the drives with which the prebending of the length of material are controlled and the drives at the device according to the invention are laid out in such way that according to a preferred form of construction, the length of material sags free of stress between the rerouting points of the length of material and the insertion into the form body belt and the form tool.

Based on the method according to the invention, the device designed according to the invention with a view to forming the undulation provides further advantages for the other production steps.

While the undulation, already in its final form in a straight portion or section of the form body belt after the rerouting/shaping point, is still on the form bodies, it can easily be glued in the summit areas of its outer loops on the form bodies for subsequent attachment of the carrier sheet. In the conventional method, generally the entire carrier sheet was glued although only partial sections of it come in contact with the undulation, in such a way that there was an unnecessarily large amount of glue used. In limiting gluing to the summit areas of the lower loops, considerable amounts of glue are saved, whereby a more expensive, more quickly binding glue can be used, making it possible to considerably speed up the production process.

In order, when changing the length of material or if the device happens to be stopped, to avoid an undesired gluing of the form bodies at their apex areas, these apex areas of the form bodies have recesses in the sections in which gluing elements come into contact with the length of material. In this way, when the device is stopped, a sticking or gluing of the apex areas of the form bodies can be avoided. These recesses in the form bodies do not have any consequential effect on the shaping of the length of material because as a rule, the gluing installation only glues partial sections of the length of material. Since the gluing installations do not exercise any high pressure on the apex area of the undulation, there are hardly any instances of misshaping caused by these recesses.

Under certain circumstances, the now fixed corrugated strip can also be cut into lengths or divided into corrugated strip packaging parts of determined length while the corrugated strip is still on the straight section of the form body belt. Consequently, it is possible to provide cutters that engage, from above, summit-level grooves of the form body and cut off the corrugated strip in the process. Possibilities for this engaging are, among others, cutters running along diagonally to the corrugated strip, rotating cutter wheels, or cutters moving up and down. In these summit-level grooves, metal inserts can be provided as cutting buttresses, for example. It is also possible to provide cutters imbedded in the form bodies. These cutters would be lifted by external guiding means at a specific separating point of the device in order to divide the corrugated strip, where necessary under the pressure of a mating roll.

Finally, the form bodies must be removed from the corrugated strip or the already divided corrugated strip packaging parts. This is advantageously carried out at a further rerouting point of the form body belt, at which the corrugated strip or the corrugated strip sections are guided straight on but the form bodies are diverted out of the undulations. The fixed undulation should have sufficient elasticity for this. But it is also conceivable to pull the corrugated strip sections laterally off the form body belt during further movement on a straight trunk of the form body belt.

A device formed according to the invention can be easily adapted to the production of different undulation sizes or undulation shapes by simply replacing the flexible form body belt, the outer contours of which must correspond precisely to the undulation anyway. Different lengths of corrugated strip packaging parts can be easily produced if retractable cutters are only used in certain ones of the form bodies or only certain cutters of the belt are activated from outside at any given time for cutting.

If the form bodies are attached fixed on a rotating belt and do not have to be conveyed individually as in conventional devices, the device according to the invention allows relatively fast production speeds.

BRIEF DESCRIPTION OF THE DRAWINGS

The invention is explained in greater detail with the help of the embodiments described in the drawings in which.

DETAILED DESCRIPTION

Figure 4:
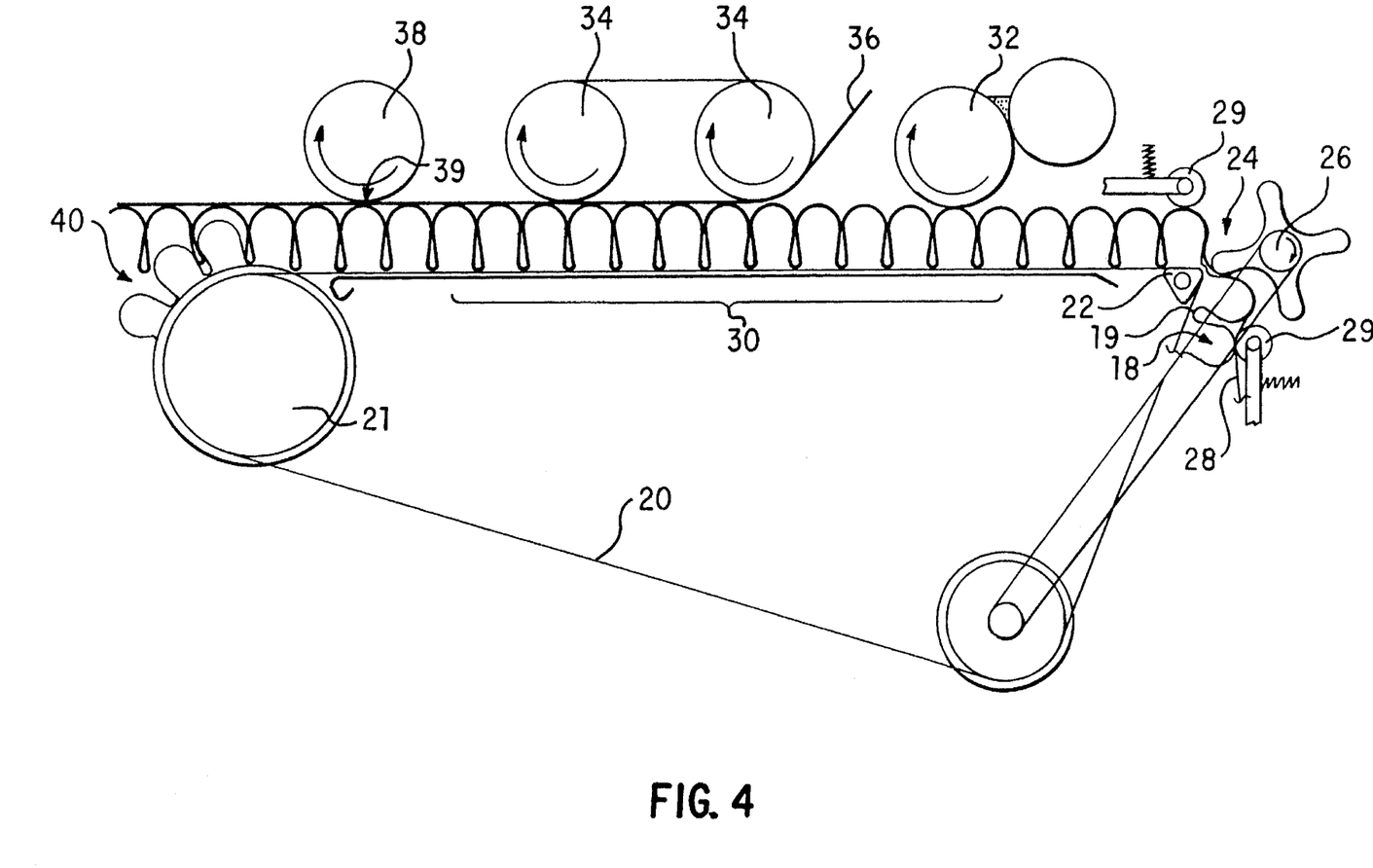
FIG. 4 is a longitudinal section through the device for producing corrugated strip packaging parts.

FIG. 4 shows in longitudinal section a diagram of a device according to the present invention to produce corrugated strip packaging parts.

The device has a number of rotating, longitudinal form bodies 18 arranged on an endlessly rotating belt 20 driven via a roller 21. This belt 20 is guided over a triangular rerouting roller 22 at which, by rerouting of the belt 20, two adjacent form bodies 18 are temporarily spread apart to form an enlarged intermediate space. A form tool 26 is arranged adjacent to this rerouting point 24 to engage this enlarged intermediate space. By this engaging of the form tool 26, the length of material 28 is pressed into the interval between consecutive form bodies 18 and thereby forms a corrugated strip 2 with, alternately, upper and lower loops 4 and 6. The length of material 28 is fed in by a feeding means and pressed, by pressing devices 29 immediately before and after the rerouting point 24, against the summit areas (top portions) of the form bodies. After the rerouting point 24, seen in the direction of flow, the device displays an essentially straight section or portion 30 of the endless belt 20, at which the form bodies 18 resume their normal equidistant position after spreading and the corrugated strip 2 is essentially lying in its final form against the form bodies 18 and the form surfaces 19 connecting them. At this straight portion 30 are arranged a gluing device 32 for the external gluing of the summit areas of the lower loops 6 of the corrugated strip 2 that loop around the form bodies, a pressing device 34 for the carrier sheet 36, and a cutting device 38. After the straight portion 30, there is a second rerouting point 40 for the belt 20, at which the form bodies 18 are removed by the rerouting of the belt from the finished corrugated strip 2 which continues to run in an essentially straight line.

Figure 5:
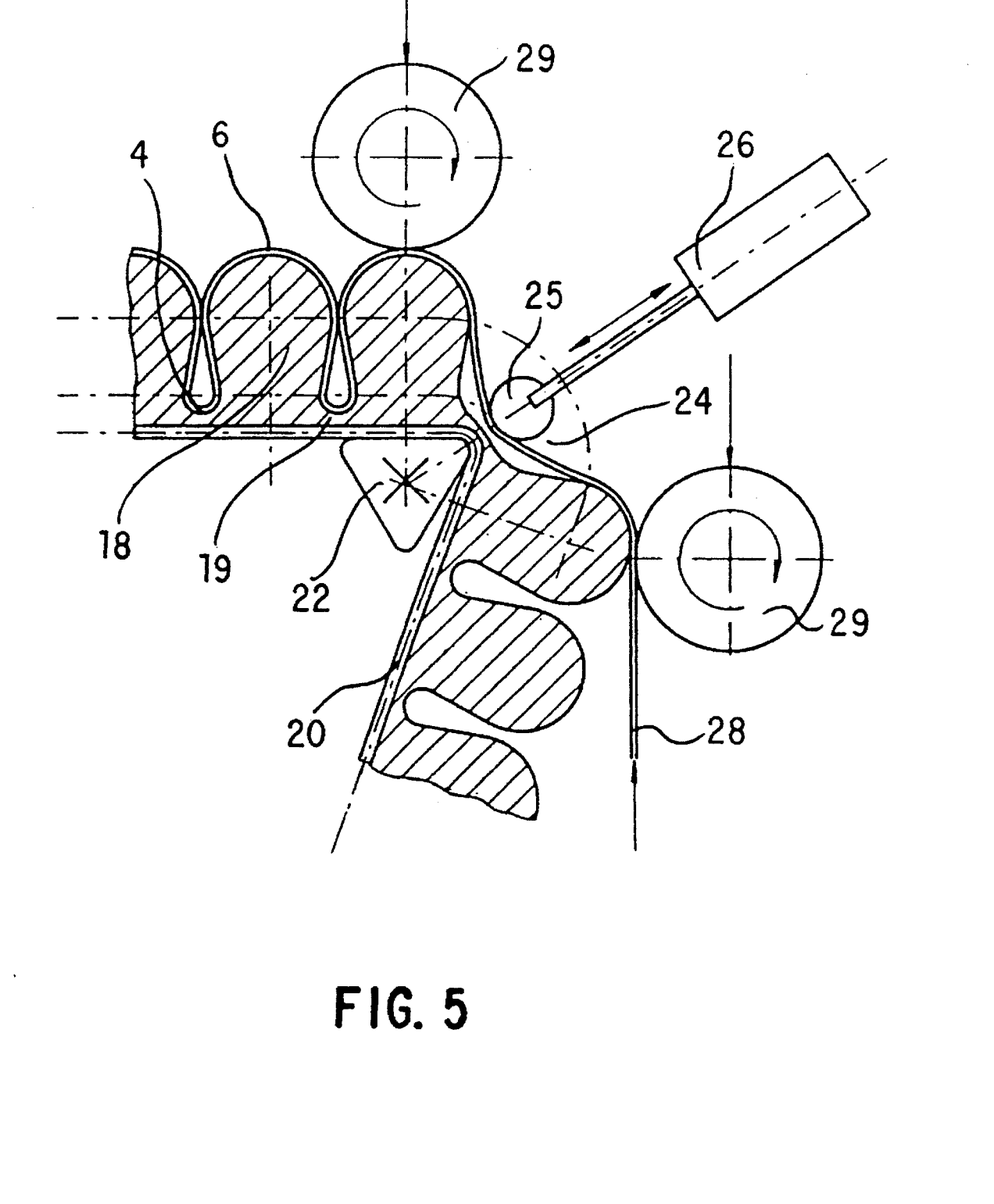
FIG. 5 is a section of FIG. 4 showing the shaping of the corrugated strip according to one embodiment.
Figure 6:
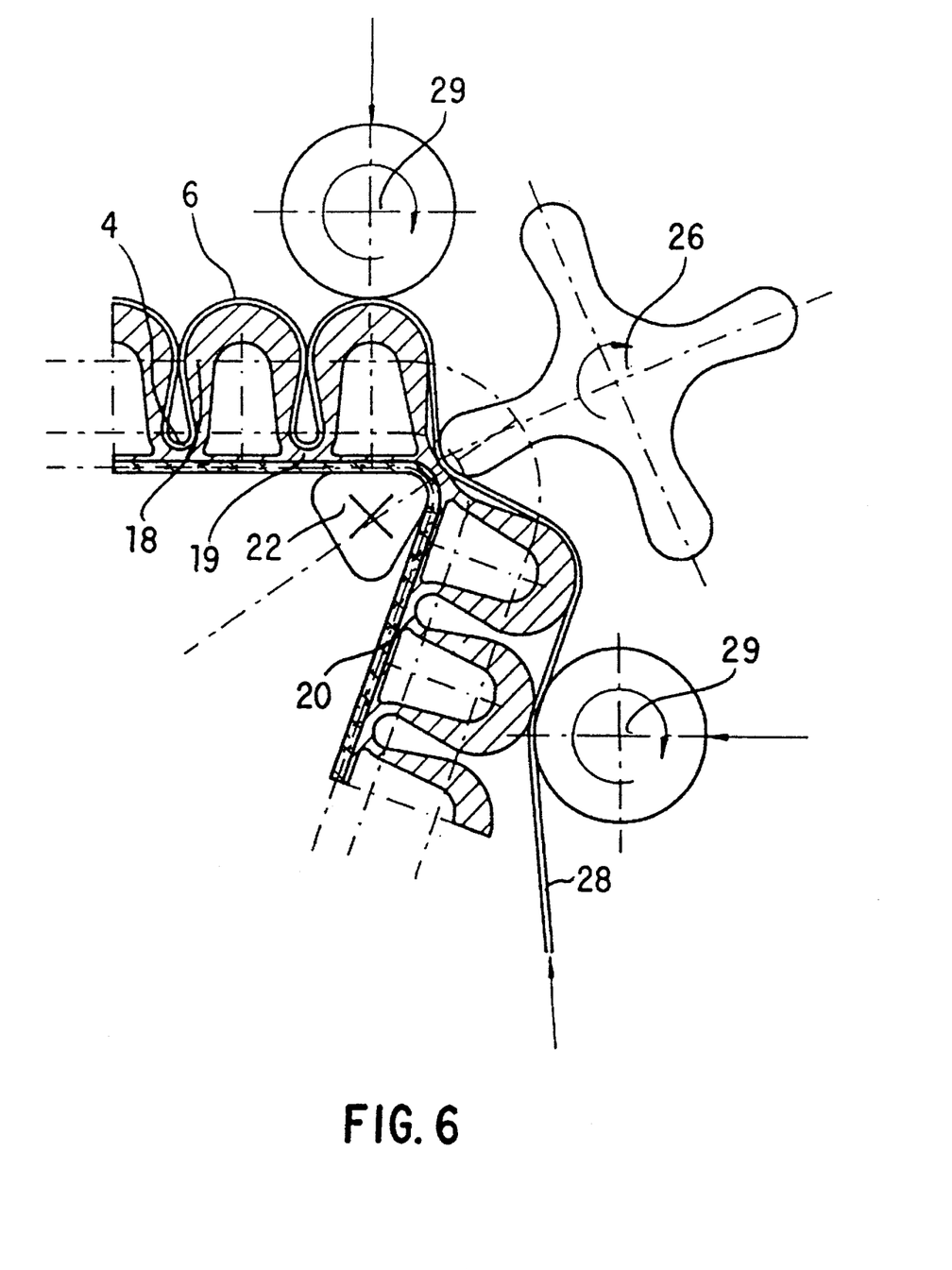
FIG. 6 is a section of FIG. 4 showing the shaping of the corrugated strip according to another embodiment.
Figure 11:
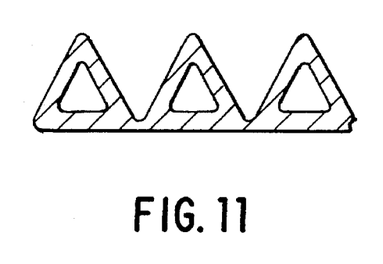
FIG. 11 is a partial section view showing triangular-shaped form bodies.
Figure 12:
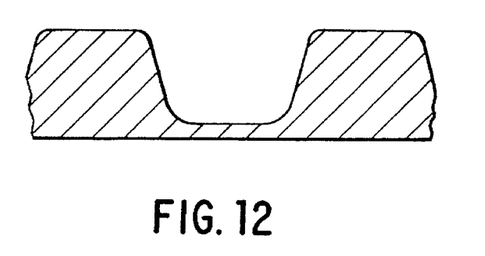
FIG. 12 is a partial section view showing trapezoidal-shaped form bodies.

FIGS. 5 and 6 each show the section of FIG. 4 showing the shaping of the corrugated strip 2. Different embodiments of the form bodies 18 and the form tool 26 are shown, but the constructions are otherwise similar. The form bodies 18 themselves can be made of a rigid, elastic material, as shown in FIG. 5. Alternatively, the form bodies 18 can also have cavities running length-wise in lumen shape, as shown in FIG. 6. The form bodies 18 can also be designed as shown in FIG. 11 wherein the loops assume the shape of triangles, or as shown in FIG. 12 wherein the loops assume the shape of trapezoids.

In their summit area, the form bodies 18 are shaped essentially convexly like a cylinder lateral surface in order to form the lower loops 6 of the corrugated strip 2. They taper toward their base on the flexible belt 20. The lateral flanks of two adjacent form bodies 18 facing each other are flexibly joined near their base by a radial crossover to form a concave form surface for the upper loops 4 of the corrugated strip 2. The base width of the form bodies 18 corresponds to the distance between the angles of the rerouting roller 22. In this way, the rerouting roller 22 engages with its edges the area between two form bodies 18 with the belt 20.

The form tool 26 can also have various forms of construction. FIG. 5 shows a form tool 26 that has a longitudinal mounting at the tips of which a round form part 25 is attached that can be moved back and forth. In the process, the form tool 26 is moved in such a way that it always engages the rerouting point 24 with its round form part 25 when immediately consecutive form bodies 18 are spread apart. In this way, the length of material 28 is pressed against the form bodies 18.

FIG. 6 shows a form tool 26 in the shape of a cruciform roller, with the four legs of the roller each assuming roughly the shape of an intermediate space between two form bodies 18. If the roller turns with the endlessly rotating belt 20, at any given time a leg of the roller engages the spread out intermediate space between consecutive form bodies 18 or a form body 18 in the intermediate space between consecutive roller legs, thus pressing the length of material 28 against form bodies 18.

As an alternative to the roller illustrated in FIG. 6, according to a preferred invention, the form tool means can also be designed as an eight-legged roller.

Figure 7:
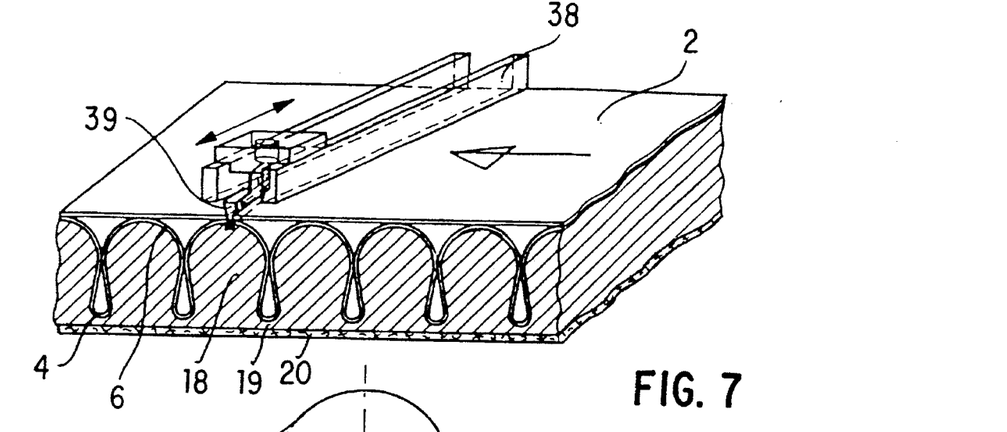
FIG. 7 is a perspective view of an embodiment for dividing the corrugated strip into corrugated strip packaging parts.
Figure 8:
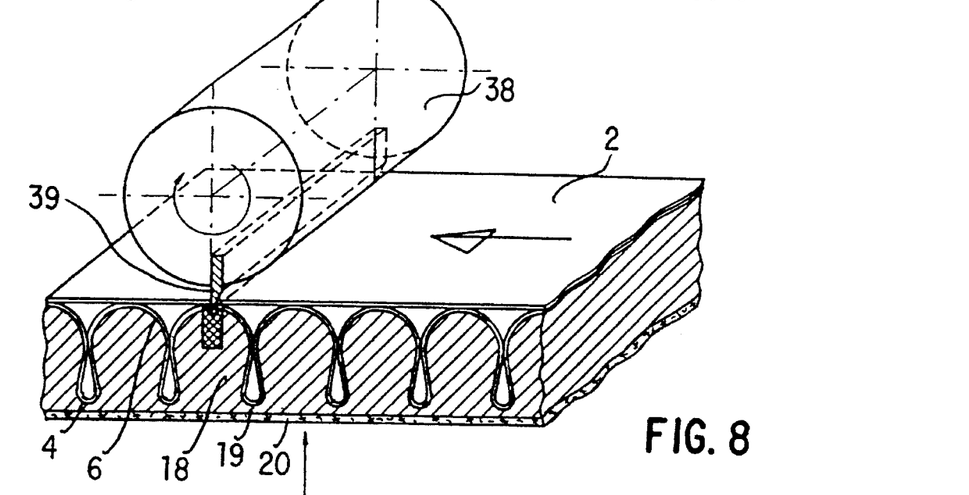
FIG. 8 is a perspective view of another embodiment for dividing the corrugated strip into corrugated strip packaging parts.
Figure 9:
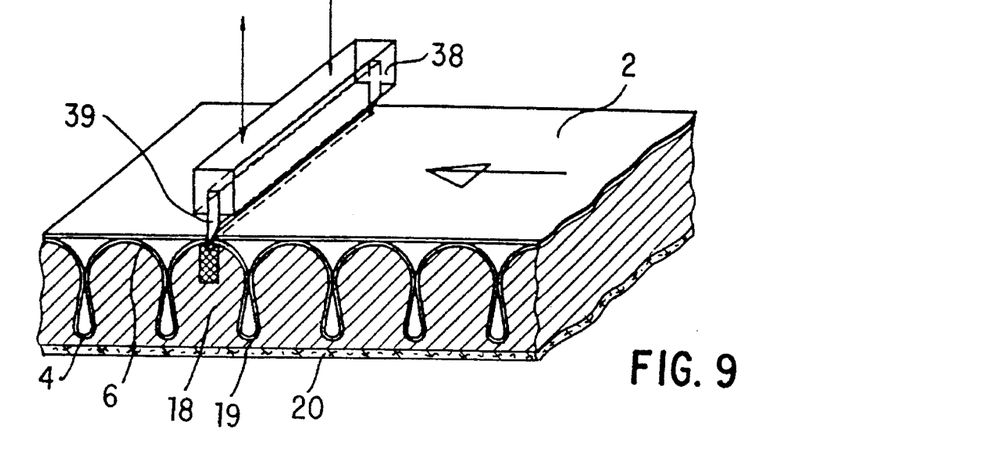
FIG. 9 is a perspective view of another embodiment for dividing the corrugated strip into corrugated strip packaging parts.

FIGS. 7 through 9 each show a perspective view of various embodiments for dividing the corrugated strip 2 into corrugated strip packaging parts.

FIG. 7 shows a cutting device 38 with a cutter 39. Its cutter 39 engages, from above, the summit area of a form body provided with a groove. The cutter 39 separates the corrugated strip 2 crosswise to its direction of flow in the summit area of a lower loop 6 by running along diagonally with the rotating belt 20.

FIG. 8 shows a cutting device 38 in the form of a cutter wheel that is arranged above the carrier sheet 36 and turns with the rotating belt 20 in such a way that at any given time the cutter 39 engages, from above, the summit area of a form body 18 provided with a groove and thereby divides the corrugated strip 2.

FIG. 9 shows a cutting device 38 with a cutter 39 that moves up and down in such a way that at any given time the cutter 39 engages from above the summit area of a form body provided with a groove and thereby divides the corrugated strip 2.

With the foregoing constructions in mind, the method for producing corrugated strip packaging parts is easily executed as discussed hereinafter.

A continuously fed length of material 28 of cardboard, pasteboard or similar work substance is brought via pressing devices 29 into contact with form bodies 18 arranged on an endlessly rotating belt 20. At the rerouting point 24, the length of material 28 is consecutively pressed into the intervals between two elongated, separated, parallel running form bodies 18 of a continuous sequence of such form bodies 18. In the process, the endlessly rotating, flexible carrier belt 20 on which the form bodies 18 are attached at equal distance is rerouted around a triangular roller. The distances between the corners of the triangular roller correspond to the width of the base surface of a form body 18, and the corners of the triangular roller each engage the flexible belt 20 between two form bodies 18. In this way, at any given time, two adjacent form bodies 18 are spread apart such that the subsequent form body 18 is still vertical to the first direction and the preceding form body 18 is already vertical to the rerouted direction of the flexible belt 20. At this moment, the length of material 28 is brought, by means of a longitudinal form tool 26, to wind around the essentially cylinder lateral surface shape sides of the form bodies 18 that are facing it, in order to form the given lower loops 6. By rerouting the length of material 28 around the form tool 26, the upper loops 4 are formed. When the subsequent form body 18, after removal of the form tool 26, also passes the rerouting point 24, it returns, with regard to its plane of symmetry, parallel to the preceding form body 18, whereby the upper loops 4 of the strip of material 28, with the form body 18 left in the lower loops 6, are pushed together crosswise to the direction of the undulations, narrowed and brought into their final form. During this pushing together of the upper loops 4, which essentially occurs individually, the undulation is guided from outside in the area of the upper loops 4 by laying against a form surface, in such a way that the upper loops 4 can and must basically maintain their original curve condition in the summit area and only the legs of the upper loops are pushed together in their middle area about halfway up. According to the invention, this form surface is practically achieved by the form bodies 18 having essentially the inside cross-section of the lower loops and being joined together at their base flanks running out toward the upper loops 4 by elastic material areas forming the form surface to lay against the upper undulation loops 4.

Figure 10:
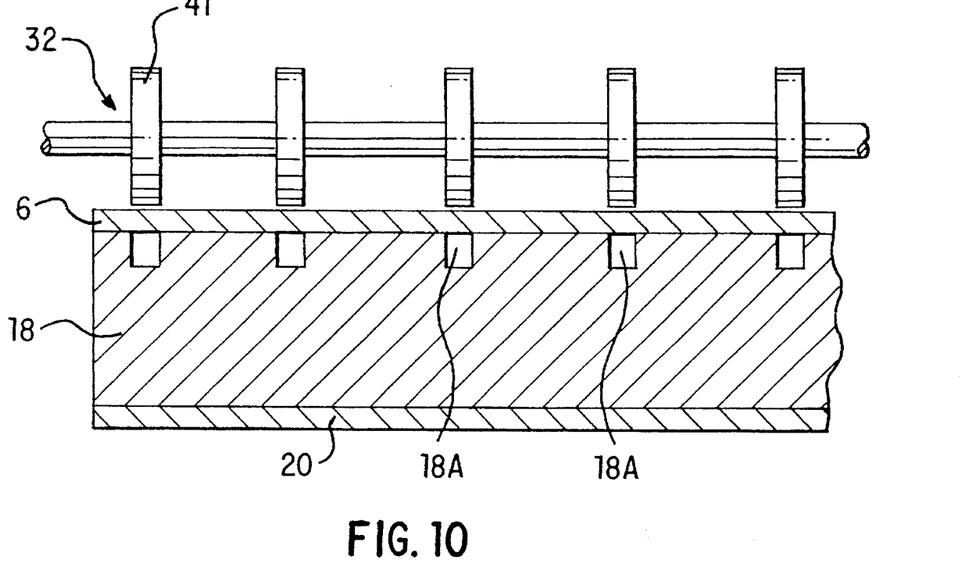
FIG. 10 is a cross-sectional view showing recesses formed in the summit areas of the form bodies.

The pushed together corrugated strip 2 then goes through a gluing device 32 where a glue is applied essentially linearly on the outside of the apex lines of the lower loops 6, while the form bodies 18 are still in the corrugated strip 2. As shown in FIG. 10, the apex areas of the form bodies 18 have recesses 18A in the sections in which gluing elements 41 come into contact with the length of material.

After that, using the pressing device 34, a carrier sheet 36 fed in is pressed onto the loops supported by the form bodies. In this way, the pushed together corrugated strip 2 is fixed with its lower loops 6 on the carrier sheet 36.

Then the corrugated strip 2 is divided by a cutting device 38 into corrugated strip packaging parts. The dividing is done either by cutters 39 engaging from above summit grooves of the form bodies 1, or by cutters 39, imbedded in the form bodies 18, that emerge from their summit area. The dividing is done in the area of the apex lines of the lower loops 6, while the form bodies 18 are still in the corrugated strip 2.

Finally, the form bodies 18 are consecutively removed from the fixed corrugated strip 2. This takes place by the flexible belt 20 being guided with the form bodies 18 through a second rerouting point 40, while the finished corrugated strip packaging part continue to be guided in an essentially straight line.

What is claimed is:

1. A method for producing corrugated strip packaging parts, comprising the steps of:

continuously feeding a first strip of packaging material to a longitudinal form tool;

pressing the strip of packaging material into a space between two elongated, parallel and separated form bodies of a continuous sequence of such form bodies using the longitudinal form tool, said pressing step comprising winding the length of material around cylindrically shaped sides of the form bodies that are facing the material to form lower loops of corrugations of a corrugated strip, and rerouting the length of material around a tip of the form tool to form upper loops of the corrugations of the corrugated strip;

removing the form tool from the space between the form bodies while leaving the strip of packaging material in the space between adjacent form bodies;

pushing the upper loops of the corrugated strip together crosswise to the direction of the corrugations such that the upper loops are narrowed;

fixing the lower loops of the corrugated strip on a carrier sheet after the upper loops have been pushed together;

consecutively removing the form bodies from the corrugated strip;

dividing the strip into individual corrugated strip packaging parts; and supporting the upper loops of the corrugated strips, during the step of pushing the upper loops of the corrugated strip together, at least in the area of a summit of the upper loops, by means of external side surfaces of the form bodies;

wherein the step of pushing the upper loops together comprises surrounding an outside surface of the upper loops with a flexible form surface connecting the two form bodies such that a summit curvature of the upper loops in a pushed together state of the upper loops is determined by said flexible form surface.

2. The method according to claim 1, wherein the flexible form surface is flexibly joined together, with lateral flanks of two adjacent form bodies facing each other.

3. The method according to claim 2, further comprising the steps of:

forming the space between two adjacent form bodies by arranging the adjacent form bodies at angles relative to one another so that their upper loops are spread apart; and pushing the upper loops together by rearranging the adjacent form bodies so that planes of symmetry of the form bodies are parallel.

4. The method according to claim 3, further comprising the steps of:

arranging the form bodies on a flexible, endlessly rotating belt, and rerouting the flexible belt to cause the spreading apart of two adjacent form bodies at a rerouting point.

5. The method according to claim 4, further comprising the step of guiding the flexible belt at the rerouting point over a cylindrical roller.

6. The method according to claim 4, further comprising the steps of:

guiding the flexible belt at the rerouting point over a rotating rod with a polygonal cross-section dimensioned such that distances between corners of the polygonal rod correspond to a base width of the form bodies; and engaging the corners of the polygonal rod with the flexible belt in the space between two form bodies.

7. The method according to claim 4, wherein the step of removing the form bodies from the corrugated strip comprises guiding the flexible belt with the form bodies over a second rerouting point.

8. The method according to claim 1, wherein the step of fixing the carrier strip comprises applying glue essentially linearly in the area of apex lines of the lower loops on the outside surface of the lower loops while the form bodies are still in the corrugated strip, and pressing the carrier strip onto the outside surface of the lower loops while the lower loops are supported by the form bodies.

9. The method according to claim 1, wherein the step of dividing the corrugated strip into corrugated strip packaging parts takes place in the area of apex lines of the lower loops, while the form bodies are still in the corrugated strip.

10. The method according to claim 9, wherein the dividing step comprises engaging grooves in the summit areas of the form bodies with cutters from above.

11. The method according to claim 9, wherein the dividing step is done by cutters that are imbedded in the form bodies and emerge from summit areas of the form bodies.

12. A device for producing corrugated strip packaging parts, the device comprising:

initial feed means for feeding a first strip of packaging material;

a plurality of longitudinal form bodies;

a form tool for pressing the first strip of packaging material into intervals between consecutive form bodies in order to form a corrugated strip from the first strip of packaging material with, alternately, upper and lower loops;

means for feeding in a carrier sheet and fixing the corrugated strip with its lower loops on the carrier sheet; and an endlessly rotating flexible belt supported such that at least one rerouting point is formed where the belt changes its direction of movement, said form bodies being arranged on said belt and having an external surface defining a general shape of the corrugations to be formed, the rerouting point of the belt providing means for temporarily spreading apart two adjacent form bodies to form an enlarged intermediate space between the two adjacent form bodies, the form tool being arranged adjacent to the rerouting point to engage and push the first strip of packaging material into the enlarged intermediate space, and the upper loops of the corrugated strip being pushed together and supported by said form bodies as said belt regains its shape after passing said rerouting point;

wherein the form bodies each have a base on the flexible belt and summit areas for forming the lower loops of the corrugated strip, and lateral flanks, facing each other, of two adjacent form bodies being flexibly joined together near the bases of the two form bodies by a radial crossover to form a concave form surface for defining the upper loops of the corrugated strip.

13. The device according to claim 12, wherein the summit areas are shaped essentially convexly and like a cylindrical surface, the form bodies being tapered toward their base on the flexible belt.

14. The device according to claim 12, wherein the form bodies are triangular in cross-section, and a side of the triangle lays against the endlessly rotating belt.

15. The device according to claim 12, wherein the form bodies are trapezoidal in cross-section, and one of the parallel sides of the trapezoid lays against the endlessly rotating belt.

16. The device according to claim 12, wherein the form bodies are made of a rigid, elastic material.

17. The device according to claim 16, wherein the form bodies have lumen-shaped cavities running longitudinally of the form bodies.

18. The device according to claim 12, wherein the flexible belt is guided at the at least one rerouting point over a prismatic, polygonal roller that has distances between its angles corresponding to a base width of the form bodies and engages the belt in the area between two adjacent form bodies with corners of the polygonal roller.

19. The device according to claim 18 wherein the polygonal roller is triangular in cross-section.

20. The device according to claim 12, wherein the flexible belt is guided over a cylindrical roller at the at least one rerouting point.

21. The device according to claim 12, further comprising an essentially straight section of belt, downstream of the at least one rerouting point and the form tool, at which the form bodies resume a normal equidistant position after having been spread apart at the at least one rerouting point, whereby the corrugated strip is laying essentially in its final position against the form bodies and form surfaces connecting the form bodies along the straight section of belt.

22. The device according to claim 21, further comprising a second rerouting point for the belt downstream of the straight section of the belt, at which, by a second rerouting of the belt, the form bodies can be removed from the finished corrugated strip that continues to be guided essentially in a straight line.

23. The device according to claim 21, further comprising, along the straight section of the endless belt, a gluing device for external gluing of the summit areas of the lower loops of the corrugated strip winding around the form bodies, and a pressing device for pressing the carrier sheet to engage the lower loops of the corrugated strip.

24. The device according to claim 23, wherein recesses are designed in areas of the form bodies brushed over by the gluing device, in such a way that in the areas of the recesses, the surface of the form body is separated from the gluing device.

25. The device according to claim 12, further comprising means for dividing the fixed corrugated strip into individual corrugated strip packaging parts, said dividing means comprising summit grooves provided in at least some of the form bodies, and cutters for engaging the summit grooves from above to divide the corrugated strip.

26. The device according to claim 12, further comprising means for dividing the fixed corrugated strip into individual corrugated strip packaging parts, said dividing means comprising retractable cutters provided in at least some of the form bodies, the retractable cutters being lifted by external guiding means to divide the corrugated strip.

* * * * *